Aug. 7, 1956   W. W. SHANNON ET AL   2,758,288
ELECTROMECHANICAL TRANSDUCER
Filed Jan. 29, 1952   3 Sheets-Sheet 1
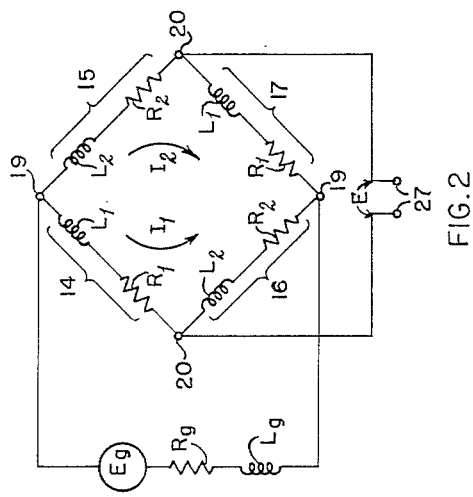
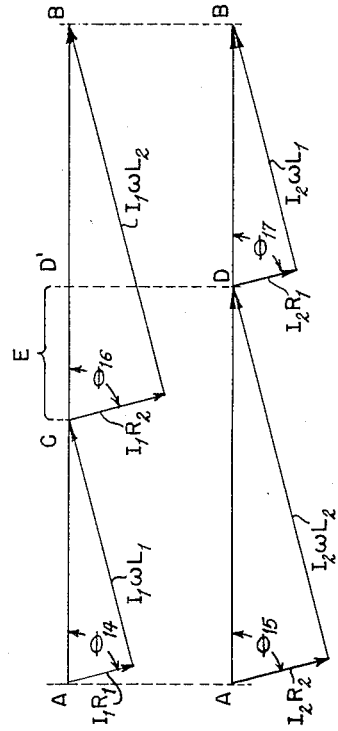
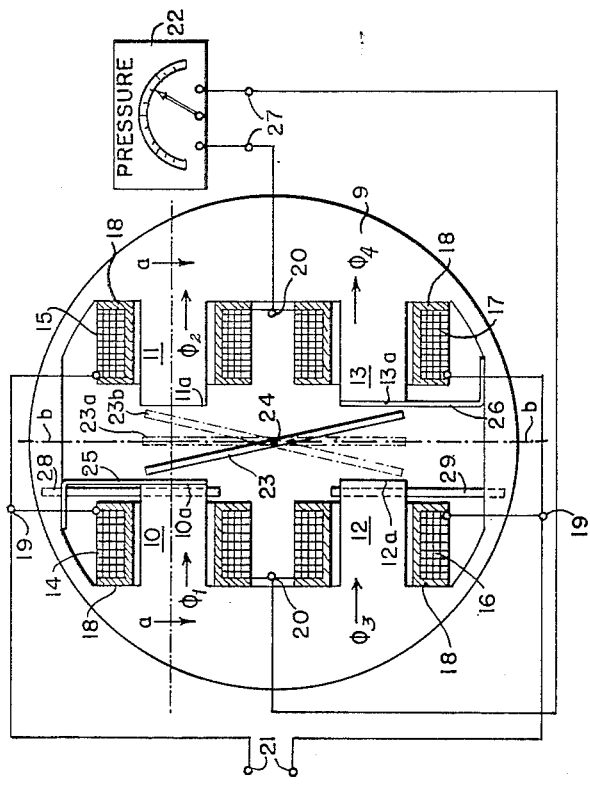
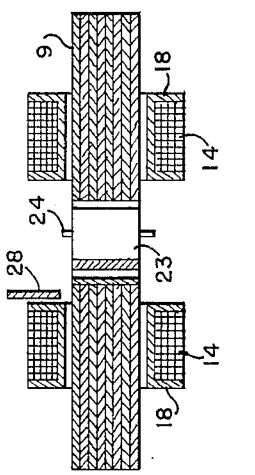
INVENTORS
WILLIAM W. SHANNON
HERBERT C. ROTERS
BY
*Eyre, Mann & Burrows*
ATTORNEYS

INVENTORS
WILLIAM W. SHANNON
HERBERT C. ROTERS

BY

*Eyre, Mann & Burrows*

ATTORNEYS

Aug. 7, 1956    W. W. SHANNON ET AL    2,758,288
ELECTROMECHANICAL TRANSDUCER
Filed Jan. 29, 1952    3 Sheets-Sheet 3
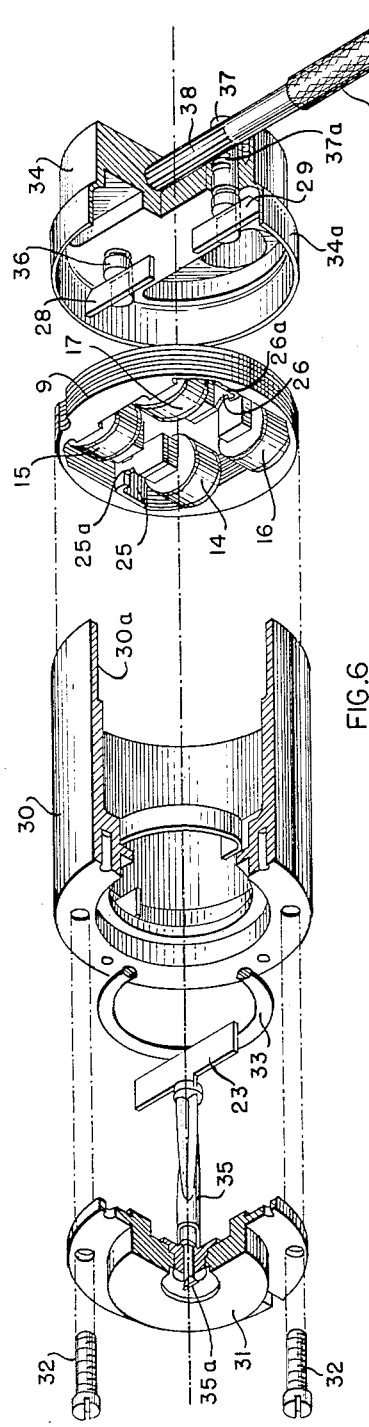
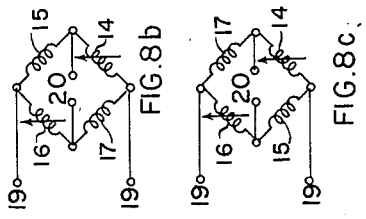
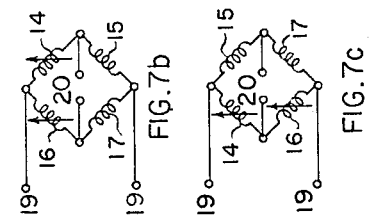
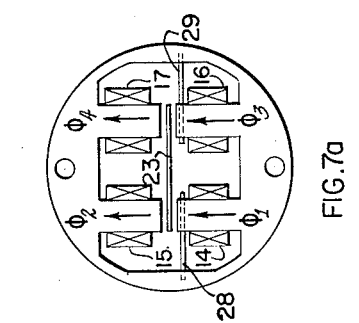
INVENTORS
WILLIAM W. SHANNON
HERBERT C. ROTERS
BY
Eyre, Mann & Barrows
ATTORNEYS

United States Patent Office 2,758,288
Patented Aug. 7, 1956

2,758,288

ELECTROMECHANICAL TRANSDUCER

William Wilson Shannon, Glen Wood Landing, and Herbert C. Roters, Kew Gardens, N. Y., assignors to Servomechanisms, Inc., a corporation of New York Application January 29, 1952, Serial No. 268,798

2 Claims. (Cl. 336—30)

This invention relates to electro-mechanical transducers and more particularly to such transducers of the type suitable for deriving an electrical signal representative of a mechanical effect, for example of a mechanical movement indicative of ambient pressure, and will be particularly described in such an embodiment. The term "electro-mechanical transducer" is used herein to refer to an apparatus comprising a magnetic core structure provided with a plurality of windings at least some of which are excited by an alternating current and having a magnetic armature for varying the distribution of the core flux through the several windings and movable in accordance with an input displacement or mechanical effect, an output signal being derived in accordance with the variation of the distribution of the core fluxes.

It is frequently desirable to derive and transmit to a remote point an electrical signal representative of a displacement or like mechanical effect, as in telemetering and remote control systems for developing indications or control effects representative of pressure, temperature, stress, etc.

For maximum accuracy and reproducibility, it is desirable that an electro-mechanical transducer have the following characteristics: stability, that is, a response characteristic which is reproducible regardless of aging and regardless of cyclic variations of stress, temperature, etc., to which the device may be subjected; a high sensitivity or scale factor, that is, a large amplitude electrical signal output for a given mechanical input; facility of adjustment of the zero input reading and the calibration scale of the device without adjustment of the armature, since provisions for adjusting the armature tend to limit the mechanical rigidity and stability of the device; symmetry of the armature relative to the core structure, which makes the device relatively insensitive to spurious displacements of the armature; an armature position for zero signal output at one extreme position on one side of the position of mechanical symmetry, which increases the range of linear response in those cases in which the input effect varies in one sense from a given reference value; a high degree of linearity of response with freedom of distortion over the normal operating range, which distortion is usually due to mechanical or electrical asymmetry, non-linear operating or reacting forces on the armature, a shift in phase between the exciting signal and the output signal, or to a combination of these factors. Electro-mechanical transducers heretofore proposed have lacked some or all of the foregoing advantageous characteristics.

It is an object of the present invention, therefore, to provide a new and improved electro-mechanical transducer which embodies one or more of the above-mentioned desirable characteristics.

It is another object of the invention to provide a new and improved electro-mechanical transducer which is particularly characterized by extreme linearity of response and ease of calibration.

In accordance with the invention, there is provided an electro-mechanical transducer comprising a closed magnetic core structure having two opposed pairs of inwardly extending poles and a winding disposed on each of the poles, such windings being connected to form a bridge circuit. Alternating current input terminals are connected to one pair of diagonal terminals of the bridge, signal output terminals are connected to the other pair of diagonal terminals of the bridge, and a magnetic armature is disposed between the opposed pairs of poles and is movable in response to a mechanical effect to be represented.

For a better understanding of the present invention, together with other and further objects thereof, reference is had to the following description taken in connection with the accompanying drawing, while its scope will be pointed out in the appended claims.

Referring now to the drawings—

Fig. 1a is a schematic representation of an electro-mechanical transducer embodying the invention;

Fig. 1b is a cross-sectional view of the apparatus of Fig. 1a;

Fig. 2 is a simplified equivalent electrical circuit diagram of the apparatus of Fig. 1a;

Fig. 3 is a vector diagram to aid in the explanation of the invention;

Fig. 4 is a fragmentary enlarged view of the movable magnetic armature of the apparatus of Fig. 1a;

Fig. 6 is an exploded isometric view of a device incorporating the transducer of the invention and illustrating a preferred application thereof; and Figs. 7a–7c inclusive, 8a–8c inclusive, and 9a–9e inclusive, are schematic representations of certain modified forms of the electro-mechanical transducer of the invention.

Figure 5:
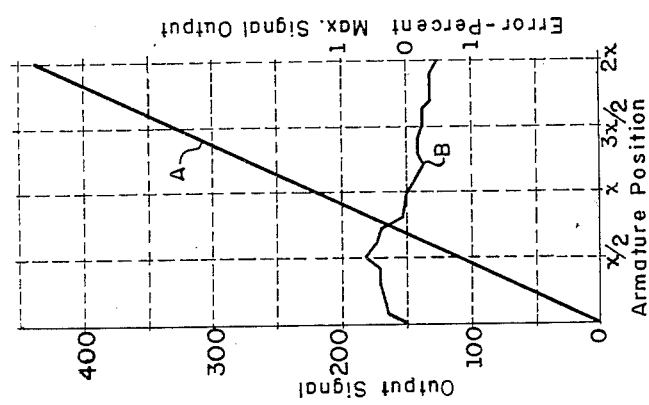
Fig. 5 is a graph representing certain operating characteristics of the apparatus of the invention.

Referring now more particularly to Figs. 1a and 1b of the drawings, there is schematically represented an electro-mechanical transducer embodying the invention and comprising a circular closed magnetic core structure 9 having two pairs of opposed parallel inwardly extending poles 10, 11 and 12, 13 having parallel opposed pole faces 10a, 11a and 12a, 13a, respectively. Individually disposed on each of the pairs of poles 10, 11 and 12, 13 are windings or coils 14, 15 and 16, 17, respectively, these windings being suitably insulated from the magnetic core structure, as by a series of spools 18 of insulation material.

The windings 14–17 inclusive are connected to form a conventional bridge circuit with pairs of diagonal terminals 19, 19 and 20, 20. In one form of the invention, for the reasons described hereinafter, the windings comprising opposite arms of the bridge, for example, the windings 14 and 17 and the windings 15 and 16, have equal numbers of turns and, in certain applications, it may be desirable to give all of the windings 14–17 inclusive, equal numbers of turns. In determining equal values of impedance, it is important that both the absolute values of impedance and the phase angles, that is, the ratio of resistance to reactance, be equal. A pair of alternating current input terminals 21 is connected to the diagonal terminals 19 of the bridge, while the other diagonal terminals 20 are connected to signal-output terminals 27, 27 of the apparatus to which is connected an indicating device, such as a voltmeter 22 which may be calibrated to read directly in terms of the mechanical effect to which the apparatus is responsive, as described hereinafter.

The transducer of the invention also includes a magnetic armature 23 pivoted about the axis 24, which is the axis of symmetry of the core structure 9. The armature 23 is in the form of a thin elongated vane which is disposed between the opposed pairs of poles 10, 11 and 12, 13 and is movable by any conventional actuating mechanism in response to a mechanical effect to be represented. The vane 23 is illustrated in one extreme position of its movement, while the dotted line representations 23a and 23b indicate its neutral position and its other extreme position, respectively. These extreme positions of movement of the armature 23 has been considerably exaggerated for the sake of clarity. In an actual design the range of movement of the armature 23 is made a very small fraction of the spacing of the poles between which it is disposed.

In order to compensate for variations in the response characteristic of the transducer of the invention with variations in ambient temperature, it also includes a pair of magnetic shunts 25 and 26, each extending between a pole face of at least one pole of each of the pairs of poles 10, 11 and 12, 13 and the body of the core structure 9 and having a temperature coefficient of permeability of a sense and value proportioned substantially to compensate for the temperature variations of the response characteristic. In one embodiment of the invention, the magnetic shunts 25, 26 are each in the form of an L, with one arm of shunt 25 overlying the pole face 10a and one arm of shunt 26 overlying the pole face 13a. The other arm of each shunt is intimately secured to a surface of the core structure 9.

It is noted that the windings 14 and 16 are connected in series across the input terminals 19, while the windings 15 and 17 form a similar series circuit. The relative polarity of connection of the windings is such that the windings 14 and 15 cooperate to send flux in one direction through the poles 10 and 11, as indicated in Fig. 1a by the fluxes $\phi_1$ and $\phi_2$, while the windings 16 and 17 similarly cooperate to send flux in the same direction through the poles 12 and 13, as indicated by fluxes $\phi_3$ and $\phi_4$. The pole face are normal to the axes of the poles so as to form a rectangular air gap between the poles of each pair which is symmetrical about an axis $b$, $b$ normal to the axes of the poles and passing through the axis of symmetry 24 of the core structure.

Figure 4:
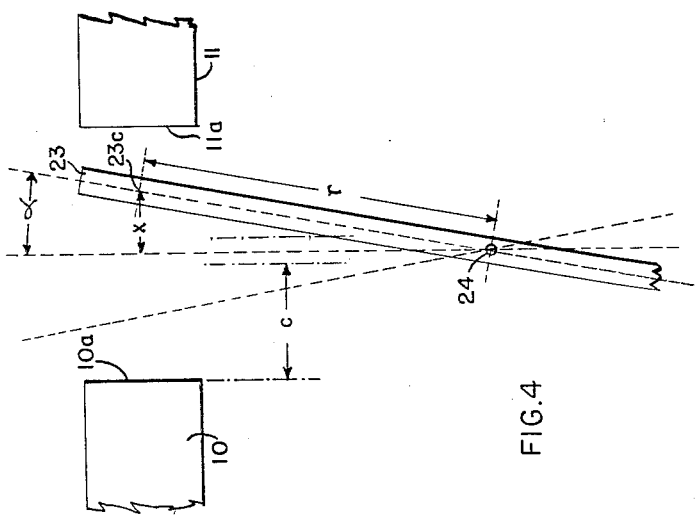

Reference is now made to Figs. 2, 3 and 4 of the drawings for an explanation of the operation of the apparatus Figs. 1a, 1b. In the simplified equivalent circuit diagram of Fig. 2, the input voltage at the terminals 21 is represented by $E_g$ and the resistance and inductance of the source by $R_g$ and $L_g$, respectively. As stated above, the opposed windings of the bridge circuit preferably have equal numbers of turns so that the impedance of each of the windings 14 and 17 is represented by the inductance $L_1$ and the resistance $R_1$, while that of each of the windings 15, 16 is represented by $L_2$, $R_2$. It is a well known characteristic of such a bridge circuit that the output voltage E appearing at the terminals 20, 20 is zero whenever the voltage drop across the winding 14 is equal to that across the winding 15 both in phase and magnitude. With the symmetrical construction shown, and with each of the windings 14–17 inclusive having the same number of turns, this occurs when the armature 23 is at its center position 23a (Fig. 1a). Motion of the armature 23 to either side of this center position develops an output voltage E dependent in phase and amplitude upon the sense and magnitude, respectively, of the displacement of the armature. This arrangement is preferable for applications in which the mechanical effect to be measured rises and falls from an intermediate reference value.

The vector diagram of the voltages of the bridge circuit with the armature 23 displaced from its center position to unbalance the bridge is given in Fig. 3. The upper vector AB shows the distribution of the supply voltage $E_g$ between the windings 14 and 16. This voltage comprises the voltage AC across winding 14 consisting of the resistance drop $I_1R_1$ and the resistance drop $I_1\omega L_1$, while the voltage CB across winding 16 consists of the resistance drop $I_1R_2$ and the reactance drop $I_1\omega L_2$. If the impedance of the indicating device 22 or other load connected to the output terminals 27 is so large compared to the impedance of the bridge circuit that it may be neglected, which is usually the case, then the currents through windings 14, 16 are equal and may be represented by $I_1$ as shown. If the phase angles $\theta_{14}$ and $\theta_{16}$, that is, the ratios of inductive reactance to resistance of the windings 14 and 16 are equal, as mentioned above, point C will lie on the straight line AB.

The lower portion of the vector diagram of Fig. 3 represents the voltage distribution across the windings 15 and 17. For the sake of clarity, the vector diagrams of the two sides of the bridge circuit have been shown one below the other rather than superimposed, which they actually are. In the lower portion of the diagram, the vector AD represents the voltage across winding 15 consisting of the resistance drop $I_2R_2$ and the reactance drop $I_2\omega L_2$, while the vector DB similarly represents the voltage drop across the winding 17 consisting of the resistance drop $I_2R_1$ and the reactance drop $I_2\omega L_1$. The point D has been projected on the upper diagram as D', so that the vector CD' represents the output voltage E of the apparatus appearing at the output terminals 27. If the phase angles $\theta_{14}$, $\theta_{16}$ of the windings 14, 16, respectively, are not equal, the point C will no longer lie on the vector AB. Similarly, if the phase angles $\theta_{15}$, $\theta_{16}$ of the windings 15 and 17, respectively, are unequal, the point D will no longer lie on the vector AB. In this event the output voltage E will not, except in unusual circumstances, be parallel to the vector AB so that it will include a component in quadrature to the input voltage. This is undesirable as it makes it impossible to get a zero output from the bridge circuit regardless of the position of the armature 23.

The design computations for an electro-mechanical transducer of the type described may be considerably simplified by the following assumptions, which it has been established experimentally may be made without limiting the accuracy of the apparatus beyond that due to usual manufacturing tolerances when, referring to Fig. 4, the maximum motion of the armature 23 at the axis of the associated poles 10, 11 from its center of symmetry is small compared to the distance $c$ between the armature at its center of symmetry and the pole face:

(1) The resistances $R_1$ and $R_2$ of the windings are equal to a resistance of value R.

(2) The reluctance of the core structure 9 is so small relative to that of the air gaps that it may be neglected.

(3) The permeance between the armature 23 and its associated pole faces comprises solely the permeance of the directly opposing areas of the pole faces and the armature.

(4) The armature 23, over its small range of motion defined above, may be considered parallel to the pole faces 10a and 11a.

(5) The impedance of the indicator device 22 or other load circuit is infinite, or so large relative to the bridge circuit impedances that it may be neglected.

(6) All leakage fluxes are sufficiently small that they may be neglected. Such leakage fluxes ordinarily do not alter the basic relationships set forth below but may act as effective magnetic shunts, thereby reducing the sensitivity of the apparatus.

With the foregoing assumptions, it can be shown that the output signal E and the impedance Z, as seen by the load, are represented by the following relations:

$$E = \frac{j\omega L \frac{r}{c} \alpha}{(R+R_g) + j\omega(L+L_g)} \quad (1)$$

$$Z = R + j\omega L \quad (2)$$

where $$2L = L_2 + L_1$$

$$L_2 - L_1 = 2L\frac{x}{c} = 2L\frac{r}{c}\alpha$$

$r$=effective radius of the armature 23 from its axis 24 to the point 23c.
$\alpha$=angular deflection of armature 23 from its center position.

From Equation 1 it is seen that the output voltage E of the transducer is directly proportional to its angular movement $\alpha$ from its center position.

The design formulae of Equations 1 and 2 may be further simplified if the following assumptions are realized:

(1) The impedance $R_g$, $L_g$ of the source is so small in comparison to the impedances $R_1$, $L_1$ and $R_2$, $L_2$ that it may be neglected.

(2) The resistances $R_1$, $R_2$ of the transducer windings are small compared to the inductive reactances of the windings $\omega L_1$ and $\omega L_2$.

With these assumptions, Equation 1 is simplified as follows:

$$E = \frac{r\alpha}{c} E_g \qquad (3)$$

Since, for small values of $\alpha$, $$r\alpha = x \qquad (4)$$

Equation 3 may be written as $$E = \frac{x}{c} E_g \qquad (5)$$

Thus, under the assumptions and approximations set forth above, the output voltage E, in terms of the input voltage $E_g$, varies proportionately to the motion $x$ of the armature.

As mentioned above, any leakage fluxes between the poles which do not link the armature 23 affect the sensitivity or scale factor of the apparatus and they also affect the position of the armature for zero output. This property may be made use of to effect an adjustment in these characteristics of the apparatus. To this end, a magnetic shunt is disposed adjacent at least one pole of each of the two pairs of poles 10, 11 and 12, 13. As shown in Figs. 1a, 1b, there are provided a pair of magnetic shunts 28, 29 individually disposed adjacent the poles 10, 12 associated with the windings 14, 16, respectively, comprising adjacent arms of the bridge circuit connected in series across the input terminals 19, 19. As brought out hereinafter, these shunts are independently adjustable to adjust either the zero position of the armature 23 or the sensitivity or scale factor of the apparatus, or both. These magnetic shunts 28, 29, as well as the laminations of the core structure 9, are preferably made of magnetic material of high permeability, such as No. 4750 nickel-iron alloy or high silicon steel, and are effective to divert or shunt a certain amount of the flux from the poles of the windings 14, 16 from the armature.

The shunts 28, 29 are arranged to be moved toward or away from the core structure 9 in a plane normal to it. By moving only one shunt, for example, the shunt 28, the output voltage may be varied. Thus, when the shunt 28 is moved nearer the core structure 9, the inductance of winding 14 is increased, while that of the winding 16 remains the same. Therefore, the voltage drop across winding 14 increases, while that across winding 16 decreases. Conversely, if the shunt 29 is moved closer to the core structure 9, the inductance of winding 16 is increased and its voltage drop is increased, while that of winding 14 is decreased, and vice versa. Thus, referring to Fig. 3, it is possible to move the point C back and forth along the vector AB, thereby modifying the output voltage E, without any adjustment of the neutral position of the armature 23. At the same time, the distribution of the voltages across windings 15 and 17 is not materially affected so that the point D on vector AB remains stationary. Thus, if the output voltage E of the apparatus is not zero when the armature 23 is in its initial position as determined by the mechanical arrangements, it is possible to adjust it to zero by adjusting one or the other of the magnetic shunts 28, 29.

On the other hand, if the two magnetic shunts 28, 29 are moved toward or away from the core structure 9 in unison, a greater or lesser amount of flux is diverted from the armature 23 so that the sensitivity or scale factor of the transducer is reduced or increased, respectively; that is, adjustment of the shunts in unison is effective primarily to modify the calibration characteristic of the transducer, while adjustment of only one of the shunts, or of the two shunts in opposite senses, is effective primarily to obtain zero output voltage of the transducer for a desired initial position of the armature 23. The provision of such adjustments by means of the magnetic shunts 28, 29 contributes very considerably to the overall stability of the transducer since it eliminates the necessity of providing mechanical adjustments of the armature 23. Such adjustments are very important because all transducers of a given rating must be designed to provide the same calibration characteristics so that they may be used interchangeably.

In the transducer described above, it has been assumed that it is desired to respond to a mechanical effect or displacement which rises or falls from an intermediate reference value, that is, one which changes in sense or polarity. For some applications it may be desirable to provide a transducer which responds to mechanical effects of only a given sense or polarity from a reference value. Thus, in measuring atmospheric pressure it is customary to measure it from a reference value corresponding to sea level. Since all atmospheric pressures normally measured are less than at sea level, it is desirable in this instance to provide a transducer which responds to a mechanical effect of only a single polarity. Since the response of an electromechanical transducer becomes progressively more non-linear as its deflection range increases, in such cases it is desirable for maximum linearity to make the zero position of the armature one extreme position, for example the position represented by the deflection $\alpha$ in Fig. 4. This can be accomplished in the transducer of the present invention by giving the windings comprising adjacent arms of the bridge circuit unequal numbers of turns and thus unequal values of impedance at the center position of the armature and proportioned to have equal values of impedance to provide substantially zero signal output in the extreme position of the movable armature.

Since the inductance of each of the windings varies as the product of the square of the number of turns and the permeance of its associated air gap, it is possible to make the inductances of the windings equal with the armature 23 in one extreme position by adjusting the turns of the windings to compensate for the difference in the air gap permeance under the faces of the opposed poles, for example between the armature 23 and the pole face 11a and between the armature 23 and the pole face 10a of Fig. 4. If the inductances are made equal in this fashion and the resistances are also made equal, the bridge circuit will be in balance and the output voltage will be zero. With this arrangement, as contrasted with the symmetrical arrangement first described, there will be an actual flux through the armature in its zero position, that is, its position of zero output signal. Movement of the armature from its extreme position unbalances the bridge in the same manner as that described above and the foregoing equations apply equally to such a modified design, if the armature deflection $\alpha$ be measured from such extreme position.

It can be shown that the ratio between the turns of the windings 15 and 14 to effect a value of zero output voltage when the armature is displaced initially by the amount $x$ from its position of symmetry, as shown in Fig. 4, in the simple case where leakage flux is neglected, is given by the following equation:

$$\left(\frac{N_2}{N_1}\right)^2 = \frac{c+x}{c-x} \quad (6)$$

where $N_1$, $N_2$ = numbers of turns of the windings 14, 15, respectively.

Referring now to Fig. 6 there is represented an electromechanical transducer of commercial form incorporating the pick-off device of the invention. The apparatus of Fig. 6 includes a structurally rigid annular housing member 30 having a rigid cylindrical base member 31 adapted to be rigidly secured to the housing member 30 by means of machine screws 32, or equivalent, to form a rigid unitary structure. If desired, a packing ring 33 may be interposed between the base member 31 and the housing to provide a fluid-tight seal. The cylindrical core structure 9 is proportioned to be tightly fitted within a second rigid cup-shaped housing member 34 having an annular flange 34a which may be spun over the edge of the core structure 9 to hold it firmly in position. The housing member 34 is then tightly fitted within an annular recess 30a of member 30, as by press-fitting, to form a unitary housing comprising the members 30, 31, 34.

The magnetic armature or vane 23 is supported from the base member 31, whereby spurious movements of the armature relative to the core structure 9 are substantially eliminated. The device of Fig. 6 is adapted to the measurement of barometric pressure and to this end a pressure-sensitive element is provided for semi-rigidly but resiliently supporting the armature 23 from the base member 31 and for rotating it in response to variation of ambient pressure. Specifically, this pressure-sensitive element is in the form of an elongated, spiral-fluted Bourdon tube 35 having one end rigidly supported in the base member 31 and the other end rigidly supporting the armature 23. If the Bourdon tube 35 is intended to respond solely to ambient pressure, acting on the external surface of the tube, one end may be sealed off, as indicated at 35a. On the other hand, if it is intended to respond to various sources of fluid pressure, the end 35a may be left open for connection to any desired fluid pressure source.

The magnetic shunts 28, 29 are rigidly secured on posts 36 and 37, respectively, which are longitudinally slidable in bores in the housing member 34. These posts are provided with racks, such as the rack 37a of post 37, or equivalent adapted to be operated by a pinion 38 on the end of an adjusting tool 39, the tool being inserted in transverse bores in the base 34 for engaging the racks of the posts 36 and 37, respectively. The posts 36 and 37 are mounted in such a way as to provide ample friction for retaining them in their adjusted positions or may be locked in adjusted position by set-screws or the like (not shown).

The temperature compensating magnetic shunts 25, 26 may have restricted portions or necks 25a, 26a, respectively, as shown in Fig. 6 to increase the reluctance of these shunts to an appropriate value.

There are given below the essential design specifications of one commercial model of an electromechanical transducer embodying the invention, although it will be understood that these specifications are purely illustrative and that the invention may be embodied in a wide range of devices in accordance with the application to be satisfied:

Core structure 9:
    Stack of 13 17 mil laminations of No. 4750 nickel-iron alloy 1⅞ inches diameter, giving stack height of ¼ inch.
    Four poles 10–13, inc., length 0.496 inch; width 0.250 inch. Spacing c: 0.037 inch.

Armature 23:
    Length $2r$ ¾ inch; width ¼ inch; thickness 0.026 inch.
    Maximum displacement $x = 0.00375$ inch.

Windings 14, 17:
    2800 turns No. 40 wire.
    $L_1$—0.430 henry; $R_1$ 350 ohms.

Windings 15, 16:
    3100 turns No. 40 wire.
    $L_2$—0.500 henry; $R_2$ 385 ohms.

Magnetic shunts 28, 29:
    No. 4750 nickel-iron alloy; length 11/16 inch; width ¼ inch; thickness 0.026 inch.
    Range of spacing from core structure 9 0.001 inch to 0.030 inch.

Temperature compensating shunts 25, 26:
    30% nickel, nickel-iron alloy having a temperature coefficient of relative permeability of 0.48 per degree F.
    Cross section at neck 0.030 inch x 0.002 inch.
Input voltage: 15 volts.

The response characteristic of apparatus having the specifications given above is represented in Fig. 5 in which curve A represents variations in the output signal of the device in arbitrary units plotted against the displacement of the armature 23 from its zero position, which is the position displaced by angle $\alpha$ from its central or neutral position. Curve B represents on an enlarged scale the deviation of the response from linearity expressed as a percentage of the signal output for maximum deflection. It is seen that the percentage error varies within a range of approximately $+0.6\%$ to $-0.4\%$, although this error is near the limit of accuracy of measurement of the apparatus. Thus it is seen that the response of the apparatus is almost exactly linear over its full operating range.

In the electro-mechanical transducer described above, the windings of each of the pairs 14, 16 and 15, 17 are connected in series across the input terminals 19, 19 with such polarities that the fluxes $\phi_1$–$\phi_4$, inclusive, are all in the same direction and only the difference of the pole fluxes passes through the armature 23. In this arrangement, the apparatus responds only to pivotal movement of the armature 23 and translatory movement of the armature introduces a certain amount of error. Other connections of the windings 14–17, inclusive, and other polarities of connections provide transducers suitable for pivotal movement of the armature or translatory movement of the armature, or either pivotal or translatory movement. Certain of these arrangements are shown schematically in the remaining figures of the drawings. Thus Fig. 7a is a schematic representation of the apparatus of Fig. 1a, while Fig. 7c is a schematic circuit diagram of the winding connections. The windings 14 and 16 are indicated as being adjustable, representing the adjustment of the inductances of these windings by the magnetic shunts 28, 29, respectively. As stated above, this arrangement is suitable only for pivotal movement of the armature. Fig. 7b represents another arrangement and connection of windings for producing the fluxes shown in Fig. 7a and having similar characteristics, comprising essentially an interchange of the input and output connections.

Figure 9A:
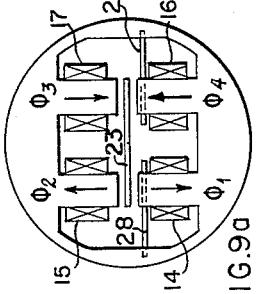

Winding connections and polarities for translatory movement of the armature perpendicular to the pole faces are shown in Figs. 8a–8c, inclusive, in which similar reference symbols identify corresponding elements. As shown in Fig. 8a, the armature carries only the difference of the pole fluxes. Winding connections permitting either pivotal or translatory movement of the armature are represented in Figs. 9a–9e, inclusive. As shown in Fig. 9a, the polarity of the winding connections is such that the armature carries the sum of the pole fluxes.

Figures 9B, 9C, 9D, 9E:
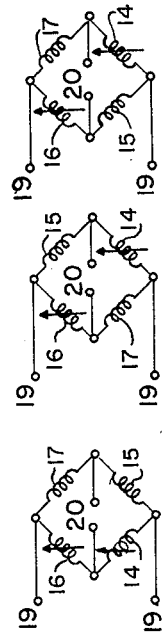

When the windings are connected as shown in either of Figs. 9b or 9c an output signal results from pivotal movement of the armature, whereas when the windings are connected as shown in either of Figs. 9d or 9e an output signal results from translatory movement of the armature.

Thus it is seen that the electro-mechanical transducer of the invention has a number of desirable characteristics not found in such transducers heretofore proposed. The apparatus is relatively insensitive to undesired displacement of the armature. The design of the windings is such as to attain zero output at any desired position of the armature. This feature, with the other constructional features, imparts to the apparatus a response characteristic which is almost exactly linear over its entire operating range. The arrangement of magnetic shunts 28, 29 provides for adjustment of either the zero setting output of the apparatus or the calibration characteristics, or both, without any mechanical adjustment of the armature. The design and proportioning of the windings of the apparatus and their connection in a bridge circuit having like impedances in each arm at neutral zero output position of the armature makes the device relatively insensitive to variations in frequency of the input signal.

While there have been described what are at present considered to be the preferred embodiments of the invention, it will be obvious to those skilled in the art that various changes and modifications may be made therein without departing from the invention, and it is therefore aimed in the appended claims to cover all such changes and modifications as fall within the true spirit and scope of the invention.

Certain of the mechanical features of the structure shown in Fig. 6 including the particular means for mounting and adjusting the magnetic shunts, are not claimed herein as they do not form part of the present invention.

We claim:

1. A magnetic pick-off device comprising a circular closed magnetic core structure having two opposed pairs of inwardly extending poles with opposed pole faces, a magnetic armature disposed between said opposed pairs of poles and movable in response to mechanical effect to be represented, a winding disposed on each of said poles, each of said windings comprising an arm of a bridge circuit, and means for adjusting both the scale factor of the pick-off device and the armature position for zero signal output of the bridge circuit, said means comprising an adjustable magnetic shunt disposed adjacent one of said poles and said core and a second adjustable magnetic shunt disposed adjacent another one of said poles and said core, said shunts when adjusted together being effective to vary the scale factor of the device and when adjusted individually being effective to vary the armature position for zero signal output.

2. A magnetic pick-off device comprising a circular closed magnetic core structure having two opposed pairs of parallel inwardly extending poles with parallel opposed pole faces, a magnetic armature pivoted about the axis of symmetry of said core structure and movable in response to a mechanical effect to be represented, a winding disposed on each of said poles, each of said windings comprising an arm of a bridge circuit, and means for adjusting both the scale factor of the pick-off device and the armature position for zero signal output of the bridge circuit, said means comprising an adjustable magnetic shunt disposed adjacent one of said poles and said core and a second adjustable magnetic shunt disposed adjacent another one of said poles and said core, said shunts when adjusted together being effective to vary the scale factor of the device and when adjusted individually being effective to vary the armature position for zero signal output.

References Cited in the file of this patent

UNITED STATES PATENTS

| | | |
|---|---|---|
| 1,608,872 | Wallis | Nov. 30, 1926 |
| 1,988,458 | Minorsky | Jan. 22, 1935 |
| 2,027,140 | Alexander | Jan. 7, 1936 |
| 2,240,184 | Hathaway | Apr. 29, 1941 |
| 2,400,571 | Olesen | May 21, 1946 |
| 2,447,331 | Griffith | Aug. 17, 1948 |
| 2,488,734 | Mueller | Nov. 22, 1949 |
| 2,563,899 | Wiancko | Aug. 14, 1951 |
| 2,564,221 | Hornfeck | Aug. 14, 1951 |
| 2,618,776 | Wiancko | Nov. 18, 1952 |

FOREIGN PATENTS

| | | |
|---|---|---|
| 809,389 | France | Dec. 3, 1936 |
| 970,552 | France | Jan. 5, 1951 |